R. G. JONES.
METHOD OF AND MEANS FOR SEPARATING CRUDE PETROLEUM FROM MOISTURE, BASES, AND SAND.
APPLICATION FILED NOV. 26, 1909.

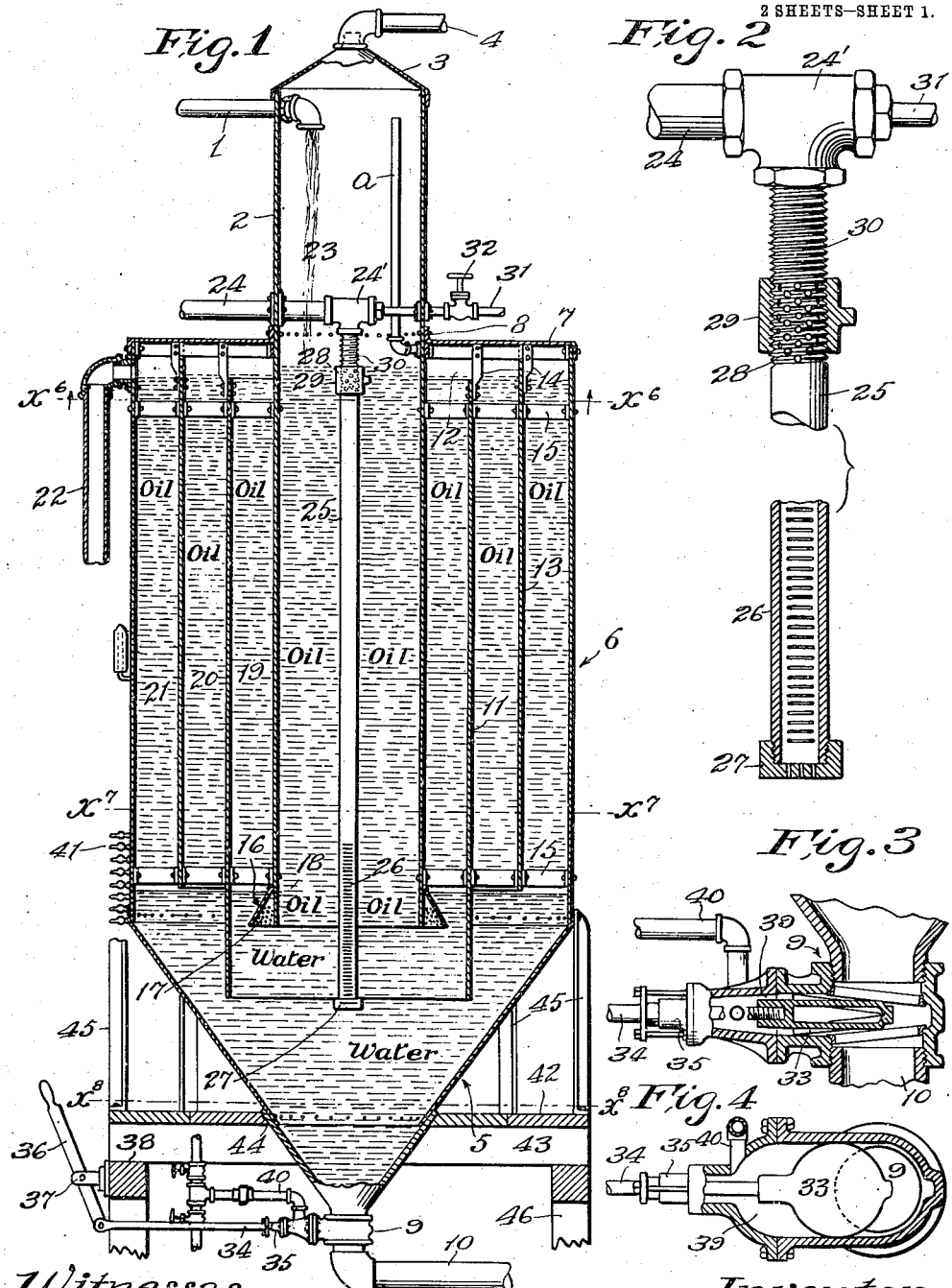

1,005,977.

Patented Oct. 17, 1911.

2 SHEETS—SHEET 2.

Witnesses
C. C. Holly
L. Belle Rice

Inventor
Richard Girard Jones
by James R. Townsend
his atty

UNITED STATES PATENT OFFICE.

RICHARD GIRARD JONES, OF LOS ANGELES, CALIFORNIA.

METHOD OF AND MEANS FOR SEPARATING CRUDE PETROLEUM FROM MOISTURE, BASES, AND SAND.

1,005,977. Specification of Letters Patent. Patented Oct. 17, 1911.

Application filed November 26, 1909. Serial No. 530,053.

*To all whom it may concern:*

Be it known that I, RICHARD GIRARD JONES, a citizen of the United States, residing at Los Angeles, in the county of Los Angeles and State of California, have invented a new and useful Method of and Means for Separating Crude Petroleum from Moisture, Bases, and Sand, of which the following is a specification.

The object of this invention is to provide for separating the moisture, bases and sand from petroleum in a most efficient, economical and rapid manner, with a plant of minimum dimensions.

An object of the invention is to make provision for quickly reducing crude oil as it comes from the wells into condition for immediate shipment, thus saving the expense of storage tanks and the loss which occurs where oils mixed with impurities are stored in sump holes which are frequently used for such storage, and which use results in great loss of oil by absorption and evaporation.

An object is to purify the oils with a minimum loss of the lighter hydrocarbons so that the viscosity of the oils will be kept at a minimum, and so that the oil may be readily pumped through pipe lines; a matter of great importance.

In this newly invented apparatus the heat is applied to a central column of oil which is surrounded by concentric hollow tubular columns of oil connected with and flowing from the central column each successive column surrounding the preceding column so that the heat applied to the central column is conserved and the oil is heated evenly by convection, conduction and radiation and its fluidity maintained while the oil is passing through the apparatus and the oil is finally discharged at a moderate temperature, 150 to 170 degrees Fahrenheit.

Another object of the invention is to prevent foam at the top of the column.

Other features and advantages of the invention may appear from the subjoined detail description.

The invention will be understood by reference to the accompanying drawings.

Figure 5:
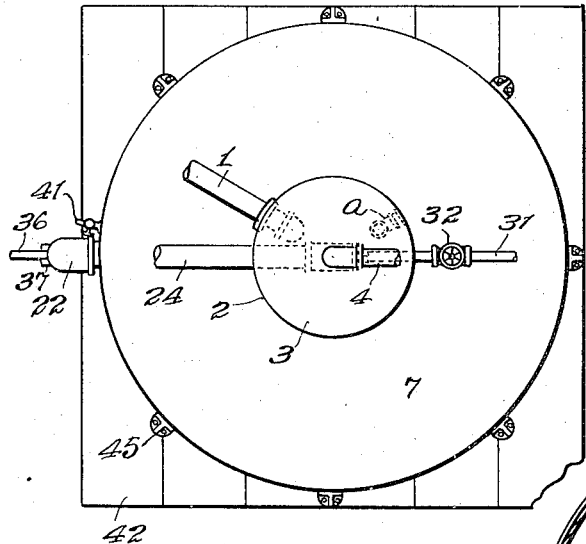
Figure 6:
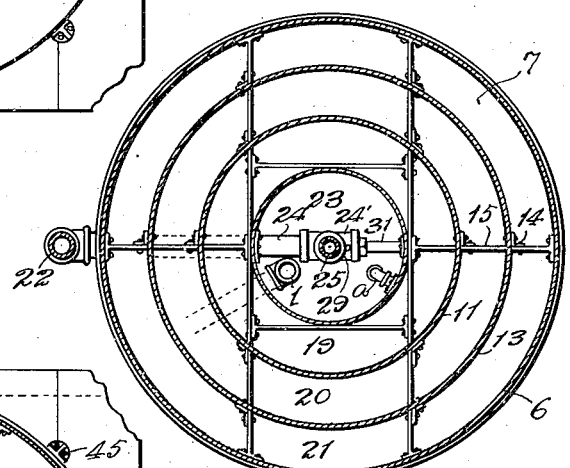
Figure 7:
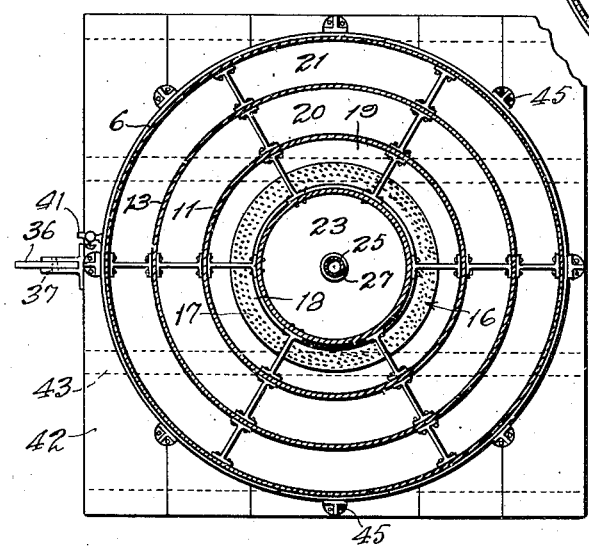
Figure 8:
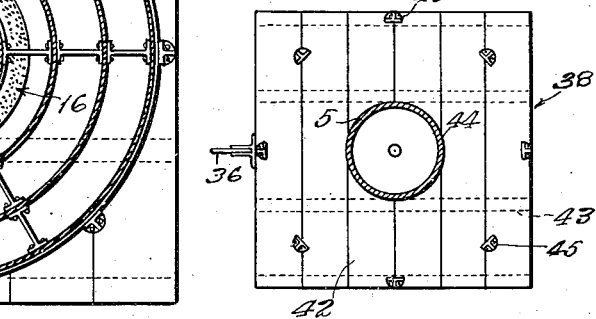

Figure 1 is a vertical axial section of apparatus adapted to carry out this invention. Some portions are shown intact. Fig. 2 is an enlarged fragmental detail of the live steam pipe illustrating the foraminous lower portion thereof and the foam reducer on the upper end. Fig. 3 is a fragmental detail of the quick opening gate showing the steam or water blow-out to clean the gate. Fig. 4 is a plan section of the gate partly open. Fig. 5 is a plan of the apparatus. Fig. 6 is a section on line $x^6$, Fig. 1 looking up. Fig. 7 is a plan section on line $x^7$, Fig. 1. Fig. 8 is a reduced plan of the frame or platform.

In starting into operation the process of purifying the oil in the apparatus shown, the relatively cold crude oil is fed through feed pipe 1 into the upper end of the central heating cylinder 2 which has a covered top 3 from which a pipe 4 leads for the discharge of those gases and vapors which may occur in the top of the cylinder. The oil falls into the funnel-shaped bottom 5 of the shell or external cylinder 6 which is hermetically sealed, being provided with a head 7 which is riveted at 8 to the cylinder 2. The bottom 5 is provided with a valved outlet 9 leading to a pipe 10 to carry off the impurities after they become separated from the oil. Surrounding and spaced apart from the central heating cylinder 2, is a cylindrical lower inner baffle 11, which projects below the level of the lower end of the central heating cylinder 2. The upper end of the baffle terminates below the head 7, thus providing an elevated passage 12 over the top of the baffle 11. Around the lower inner baffle 11, is the upper outer baffle 13, the lower end of which terminates above the level of the lower terminal of the heating cylinder 2. The baffles 11 and 13 are fastened to the head 7 by hangers 14 and are spaced apart by spacers 15 at the upper and lower portions thereof. At the lower end of the heating cylinder 2, an apron 16 having a lower foraminous portion 17 and an upper impermeable portion 18 is provided. The lower end of said apron is preferably flush with the lower end of the heating cylinder 2. The heating cylinder and the baffles are spaced apart to form an outwardly expanding sinuous passage having an inner ascending limb 19, an intermediate descending limb 20 and an outer ascending limb 21 from the upper end of which a discharge pipe 22 leads.

Steam is introduced into the central heating cylinder or chamber 23 within an oil heating steam pipe 24 which is provided with a T 24' into which the heating pipe 25 is screwed. The heating pipe 25 is provided at its lower end with a foraminous portion 26 which may be formed in any suitable way as by perforation or by sawing slits into the pipe. The lower end of the pipe is closed by a cap 27 so that the steam which enters the pipe 25 or the water of condensation from such steam, must issue around the sides of the pipe at the lower end thereof. The foraminous portion 26 extends a short distance below and above the lower end of the heating cylinder 2 and terminates about the level of the lower and open end of the inner baffle 11. The heating pipe 25 is provided about the level of the top of the inner baffle 11 with a perforated portion 28 which may be covered by a sleeve 29 screwed onto the screw-threaded portion 30 of the pipe 25, which screw-threaded portion is of sufficient length to allow the sleeve 29 to screw on or off of the perforated portion so as to open and close a greater or less number of the perforations at the will of the attendant, thus to provide for a lesser or greater flow of steam as may be required to reduce the foam of the particular oil treated. An escape pipe 31 provided with a valve 32 is connected with the T 24' to allow steam to escape in case of excess pressure which might occur if the steam pipe 24 were connected with the exhaust of a steam engine. A vent pipe $a$ connects the top of the settling and heating chambers with the dome. The purpose of this is to allow the liquid to flow into and from the settling chamber formed by the ascending and descending limbs 19, 20 and 21, and also allow gas from the limbs 19 and 20 to escape through the upper end of the heating chamber.

The valve 9 may be of any suitable construction and is preferably a straight open gate valve having a wedge-shaped disk 33, controlled by a valve rod 34 working through a stuffing box 35 and operated by lever 36 pivoted at 37 to the frame 38 which supports the apparatus. Said valve disk operates in the valve chamber 39 into the rear of which a cleansing pipe 40 connected with a source of steam or water under pressure leads for the purpose of passing a cleansing stream whereby the impurities may be readily blown out while the impurities from the shell are discharging, so that the gate may freely close.

In starting the process, steam will be turned on through pipes 24 and 25, and the crude oil allowed to flow through the pipe 1 will at first accumulate in the bottom of the shell 6 and will rise above the bottom of the inner baffle 11 and above the foraminous portion 26 of the pipe 25 and the steam begins to heat the crude oil at the lower end of the cylinder 2 and baffle 11. This heating continues as the oil rises and the oil will finally flow over the top of the inner baffle 11, and at about the same time the oil will also begin to flow out of the pipe 22, the mouth of which is practically on a level with the top of the inner baffle. As soon as the oil begins to flow out through the pipe 22, the movement of oil through the passages 19, 20 and 21, becomes established, and from that time on the oil is heated interiorly along the axis of the column of oil by the descending steam pipe 25 and the steam which issues from the foraminous portion 26 at the bottom of such pipe. The pressure and temperature of the steam flowing through the pipes 24, 25 is kept down for the purpose of not overheating the oil, and I deem it advisable to operate with a depth of about seven and one-half feet more or less of oil between the level of the lower end of the heating cylinder and the upper end of the inner baffle 11. The upper end of the inner baffle may be seven or eight feet more or less above the bottom of the heating cylinder; and the inner baffle 11 may be between eight or nine feet more or less deep and the steam pipe terminates at the bottom of the baffle 11 so that a low pressure of steam within the pipe 25 may be sufficient to exclude oil therefrom, and the temperature produced by the steam in the pipe will not be sufficient to cause foaming or spewing at the top of the oil in the heating chamber. It is understood that the temperature of the steam may be greater or less depending upon the amount of oil caused to flow through the apparatus, but I deem it preferable not to heat any portion of the oil above 210° Fahrenheit, and to allow the oil to flow at a low speed so that the current will not carry any of the impurities over to the final discharge at the mouth of the pipe 22. In practice the feed pipe 1 will lead directly from a pump or from an elevated tank, not shown, from which a regulated flow may occur and the steam pipe 23 may be connected with the exhaust of the engine, not shown, which runs the oil pump. If an excess of steam occurs, the valve 32 may be opened to regulate the pressure as required. When the apparatus is in full operation the steam will become condensed in the pipe 25 so that only the water of condensation will issue from the perforations at its lower end. As the oil flows down through the heating cylinder 2 it is gradually heated by the heat from the pipe and circulation is set up within the cylinder 2, the heated oil rising along the pipe at the center and the cooler oil descending at the outer sides, and as the process proceeds the oil within the cylinder 2 becomes sufficiently fluid to release the heavier and coarser materials, as water and the coarser solids carried by the oil, and said materials subside through the oil in the conical bottom. Since the steam is applied to the pipe from above and the oil enters the cylinder from above, the greatest heat is always so applied that the lowest temperature of oil is at the same place as the highest temperature of the heating medium. The conical bottom 5 will soon become filled with water from the oil and from the condensed steam, and when the water level in the apparatus rises above the perforations of the apron 16 the apparatus will be in proper condition for the operation of my newly invented method.

Try-cocks 41 are arranged above and below the desired water level so that the operator can determine at what level the water stands and it is advisable to hold the water level about even with the lower end of the outer baffle 13 which is just above the level of the perforated portion 17 of the apron, which slopes precipitously so that it affords no lodging place for sediment. When the water is at this height, the operation continues as follows: The oil which has become heated in the central heating cylinder 2 flows underneath the lower end of said cylinder and flows up through the perforations of the apron in fine streams and passes through the water which is above the level of the perforations, and the oil is thus washed by the water which is at a temperature approaching 210 degrees and is therefore effective to wash out solids from the oil. The oil thence passes up close to the cylinder 2 until it reaches the level of the top of the inner baffle 11 and then it flows outward over the top of such baffle and on to the surface of the oil contained in the chamber or descending limb 20. Thence the oil will pass down through the descending limb 20 and outward around the bottom of the outer baffle 13 and thence will rise up through the outer ascending limb 21 to the mouth of the discharge-pipe 22. During this course the heavier materials have opportunity to gradually settle down into the conical bottom 5 from which they may be drawn off from time to time by opening the gate 9.

The frame 38 comprises a platform 42 laid on sills 43 and provided with a central opening 44 in which the conical bottom 5 sits. Upright standards 45 extend from the platform 42 and are fastened to the shell 6. The sills 43 may be supported on a tower 46 so that the apparatus may be held elevated as required.

It is thus seen that in this method a column of oil is trapped above a body of water and is heated at its axis from top to bottom while caused to flow downward under the baffle and then up through the water and thence upward and downward in a sinuous course through progressively enlarging chambers to an outlet; and that the water through which the oil flows is kept at a temperature below but approximating to that of boiling water so as to maintain the oil in a comparatively high state of fluidity, and the heat is applied interiorly and along the axis of the interior oil body so that there is but slight loss by either radiation or convection.

The central heating cylinder 2 extends above the top of the shell and consequently considerably above the oil level in the cylinder, so as to afford ample space for foaming of the oil when that occurs, and the vent pipe a extends nearly to the top of the dome thus formed so that the gases and steam from within the shell may escape from the shell to the dome without allowing foam to pass into the shell. Owing to the resistance of the water and the walls which form the sinuous passage around the cylinder, the column of oil within the cylinder will be maintained at a greater height than the level of the oil at the outlet.

It is thus seen that the flow of oil into and from the cleaner may be quite rapid depending upon the amount of heat which is applied inside the column, and that there will be a circulation of oil inside the cylinder, the tendency of the oil which is heated by the pipe 25 being to rise along said pipe while the colder oil flowing in from the inlet pipe 1 will flow downward intermediate the pipe 25 and the cylinder 2. As a consequence of this method of heating the oil the heated oil which flows from the bottom of the cylinder 2 will not be as hot as the oil at the upper part of the cylinder 2. Consequently when the oil which has flowed from the bottom of the cylinder 2 passes up in the hollow tubular stream around the cylinder 2 it receives by radiation the heat from the more highly heated portion of the cylinder 2 and then conveys that heat onward to the next hollow tubular descending column of oil, and so on; and there is a constant outward flow of heat both by radiation and by convection to the outer shell from the top of which the purified oil is discharged through the pipe 22. By reason of this operation the flow of oil may be maximized and the capacity of the cleaner is very high in proportion to the size of the apparatus.

I claim:—

1. The method set forth of purifying crude oil which consists in centrally heating a column of oil, providing an open space above said column of oil, supplying oil to the column through said open space, allowing vapor to escape from the top of said column of oil, trapping the column of oil by water at the bottom thereof, and conducting the oil through the water trap and thence in a hollow tubular stream reversely flowing in alternate ascending and descending columns that are concentric with said central column, each successive column from the center outward encircling the preceding column; and meanwhile maintaining a practically constant depth of oil in said columns and above said trap so as to deposit the impurities from the oil to the water in the trap and to minimize the loss of heat by radiation and to maximize the fluidity of the oil.

2. The method if separating crude petroleum from heavier material contained therein which consists in heating a column of oil interiorly, trapping said column by a body of liquid into which the heavier materials may be received from the oil, and applying steam to the top of the oil in the column to reduce any foam that may occur.

3. Apparatus for treating oil which comprises a shell provided at the bottom with a blow-off gate and at the top with an outlet, a cylinder having an open bottom in the shell, a steam pipe to discharge steam into the shell; an inner annular baffle wall in the shell around the cylinder, extending below the bottom of the cylinder and terminating below the top of the shell to form a passage over said inner baffle wall, an annular baffle surrounding the inner baffle wall and extending from the top of the shell and terminating above the bottom of the inner shell, and a steam pipe in the cylinder to heat the oil therein.

4. An oil cleaner comprising a shell provided with a head and with a conical bottom having a valved blow-off; a central heating chamber extending up through the head to form a vapor dome and to accommodate foam, and terminating with an open end inside the shell near the bottom thereof, concentric annular baffles supported by the head and surrounding the cylinder to form a sinuous expanding passage from the cylinder to the shell, said shell being provided at its top with an outlet for the cleaned oil, a steam pipe extending from the dome within the cylinder down into the shell and provided at its lower end with drainage outlet inside the shell, means to discharge oil into the dome, and a pipe to lead vapors from the dome.

5. In an oil cleaner the combination with a shell having an outlet at the top thereof and a head above the outlet, of a cylinder supported by the head and extending down into the shell and upwardly above the head to form a dome, said dome being provided with an outlet at its top, means to discharge oil into the dome, a steam pipe in the dome extending down through the cylinder into the shell and provided with a drainage outlet and also provided with perforations within the shell below the oil outlet therefrom, and means to open and close said perforations to admit steam to the dome.

6. An oil cleaner comprising a shell having a head and a bottom and an outlet near the head; a cylinder extending through the head and forming a dome above the head and a heating cylinder inside the shell; two cylindrical baffles arranged concentrically with the cylinder and the shell and inside the shell and around the cylinder, the baffle nearest the cylinder extending below the lower end of the cylinder and the outer baffle extending from the head to a level above the bottom of the cylinder, said cylinder and baffles being open at the bottom and the outer baffle closed at the top; a steam pipe at the center of the cylinder; means to supply steam to the steam pipe and means to supply oil to the cylinder.

7. In an oil cleaner, the combination with a heating cylinder provided with a dome, of a steam pipe in the cylinder, said pipe being provided with perforations near the dome, and a collar screwed on the pipe and adapted to close and open the perforations.

8. The method set forth of purifying crude oil which consists in axially heating a central column of oil, providing an open space above said column, supplying oil to said column through said open space, allowing vapor to escape from the top of said column, trapping and supporting said column by water at the bottom thereof, conducting the oil through the water trap at intervals and in a widening stream in a succession of annular alternately ascending and descending columns that successively surround one another and said central column, meanwhile maintaining a sufficient depth of oil in said columns above said water trap to allow the heavy impurities to precipitate to the water, maintaining a circulation within the central column to heat the oil so as to maintain maximum fluidity and minimum speed of flow of the oil in the column and in the stream with minimum application of heat; and to thereby cause the impurities to deposit into the single water trap, and drawing off the oil from the top of the outermost column.

9. The method set forth of purifying crude oil which consists in centrally heating a central column of oil, supplying oil to the top of the column and allowing a circulation of oil in said column, trapping the column of oil by water at the bottom thereof, conducting the oil through the water trap at intervals and in a widening stream in a succession of alternately ascending and descending annular columns that are concentric with said central column, meanwhile maintaining a considerable depth of oil in said columns above said water trap and thus allowing heavy impurities to precipitate into the water, maintaining a circulation of oil within the central column to heat the oil so as to maintain maximum fluidity and maximum flow of oil in the column and in the stream with minimum application of heat; and to thereby cause the heavier impurities to deposit into the single water trap, drawing off the oil from the top of the outermost column of said stream and drawing off the impurities at intervals from the water trap.

10. The method set forth of purifying oil which consists in maintaining the oil in a plurality of columns of oil in a quiescent state above and resting on a body of water, said columns comprising a central column and annular columns thereabout surrounding one another, said water forming a seal between the columns; supplying oil to the central column along the axis thereof and thereby causing a circulation of oil in the column; causing the oil to flow from column to column in an ever widening stream of decreasing speed so that the heat applied to the central column is conserved and the oil in said stream is maintained at maximum fluidity whereby the heavier impurities are caused to separate from the oil by gravity.

11. An oil cleaner comprising a vertical shell, a centrally arranged vertical cylinder in the shell, baffles between the cylinder and the shell to form a sinuous passage for alternate ascending and descending columns of oil, an apron provided with a foraminous portion fixed to the lower end of the cylinder and extending therearound, means to supply oil to the upper part of the cylinder, means to discharge oil from the upper part of the shell, means to heat oil inside the cylinder and means to retain a water seal for the bottom of the cylinder.

In testimony whereof, I have hereunto set my hand at Los Angeles, California, this 18th day of November, 1909.

RICHARD GIRARD JONES.

In presence of—
    JAMES R. TOWNSEND,
    L. BELLE RICE.